(12) United States Patent
Arcand et al.

(10) Patent No.: US 11,881,332 B2
(45) Date of Patent: Jan. 23, 2024

(54) BUS BARS

(71) Applicant: Saint-Augustin Canada Electric Inc., Saint-Augustin-de-Desmaures (CA)

(72) Inventors: Sébastien Arcand, Saint-Augustin-de-Desmaures (CA); Daniel Garneau, Lévis (CA); Félix Houde, Saint-Raymond (CA)

(73) Assignee: Saint-Augustin Canada Electric Inc., Saint-Augustin (CA)

( * ) Notice: Subject to any disclaimer, the term of this patent is extended or adjusted under 35 U.S.C. 154(b) by 266 days.

(21) Appl. No.: 17/423,355

(22) PCT Filed: Jan. 16, 2020

(86) PCT No.: PCT/IB2020/050357
§ 371 (c)(1),
(2) Date: Jul. 15, 2021

(87) PCT Pub. No.: WO2020/148708
PCT Pub. Date: Jul. 23, 2020

(65) Prior Publication Data
US 2022/0084715 A1    Mar. 17, 2022

Related U.S. Application Data

(60) Provisional application No. 62/792,933, filed on Jan. 16, 2019.

(51) Int. Cl.
*H01B 5/00*    (2006.01)
*H01B 5/06*    (2006.01)
*H02G 5/08*    (2006.01)

(52) U.S. Cl.
CPC ............... *H01B 5/06* (2013.01); *H02G 5/08* (2013.01)

(58) Field of Classification Search
CPC .................................. H01B 5/06; H02G 5/08
See application file for complete search history.

(56) References Cited

U.S. PATENT DOCUMENTS

| | | | | |
|---|---|---|---|---|
| 6,196,869 B1 * | 3/2001 | Kay | ................... | H01R 13/6583 |
| | | | | 439/716 |
| 7,413,489 B1 * | 8/2008 | LaSalvia | .................. | H01R 4/62 |
| | | | | 439/877 |

(Continued)

FOREIGN PATENT DOCUMENTS

| CN | 103227440 A | 7/2013 |
|---|---|---|
| CN | 203056133 U | 7/2013 |

(Continued)

OTHER PUBLICATIONS

Xia CN203056133U English Translation; published in 2013 (Year: 2013).*

(Continued)

*Primary Examiner* — Pete T Lee
(74) *Attorney, Agent, or Firm* — Taft Stettinius & Hollister LLP (57) ABSTRACT

A bus bar including a main tubular body extending along a longitudinal axis between a first end and a second end, the main tubular body being made of a first electrically conducting material for carrying an electrical current thereal ong, and the bus bar further including a hollow connection body longitudinally projecting from the first end of the main tubular body and provided with a mounting surface for receiving an electrical connector thereto, the hollow connection body being made a second electrically conducting material for carrying the electrical current between the electrical connector and the main tubular body.

16 Claims, 6 Drawing Sheets

(56) References Cited

U.S. PATENT DOCUMENTS

2013/0072075 A1* 3/2013 Kayamoto ............ C23C 28/021
427/123
2020/0274294 A1* 8/2020 Lynch .................. H01R 13/405

FOREIGN PATENT DOCUMENTS

| CN | 204118285 U | 1/2015 |
|---|---|---|
| CN | 104518293 A | 4/2015 |
| DE | 4022310 C2 | 6/1995 |
| GB | 1005259 A | 9/1965 |

OTHER PUBLICATIONS

Wei CN203026646 U English Translation; published in 2013 (Year: 2013).*
CN 204885473 U English Translation (Year: 2015).*
Extended European Search Report; European Patent Office; Patent Application No. 20740944.2; dated Aug. 29, 2022; 7 pages.
International Search Report; Canadian Intellectual Property Office; International Application No. PCT/IB2020/050357; dated Apr. 28, 2020; 3 pages.
Written Opinion of the International Searching Authority; Canadian Intellectual Property Office; International Application No. PCT/IB2020/050357; dated Apr. 28, 2020; 5 pages.

* cited by examiner

BUS BARS

CROSS REFERENCE TO RELATED APPLICATIONS

This application is a U.S. National Phase of International PCT Application No. PCT/IB2020/050357 filed Jan. 16, 2020, which claims the benefit of U.S. Provisional Patent Application No. 62/792,933 the contents of each application is incorporated herein by reference in their entirety.

TECHNICAL FIELD

The present invention generally relates to bus bars, and more particularly relates to bus bars for connection to an electrical conductor.

BACKGROUND

In various electrical arrangements using rigid electrical conductors connected together, flat connecting plates are typically used at terminations of flat rigid conductors. Flexible or rigid connecting conductors are connected between two flat connecting plates for connecting the corresponding electrical conductors together.

Figure 1A:
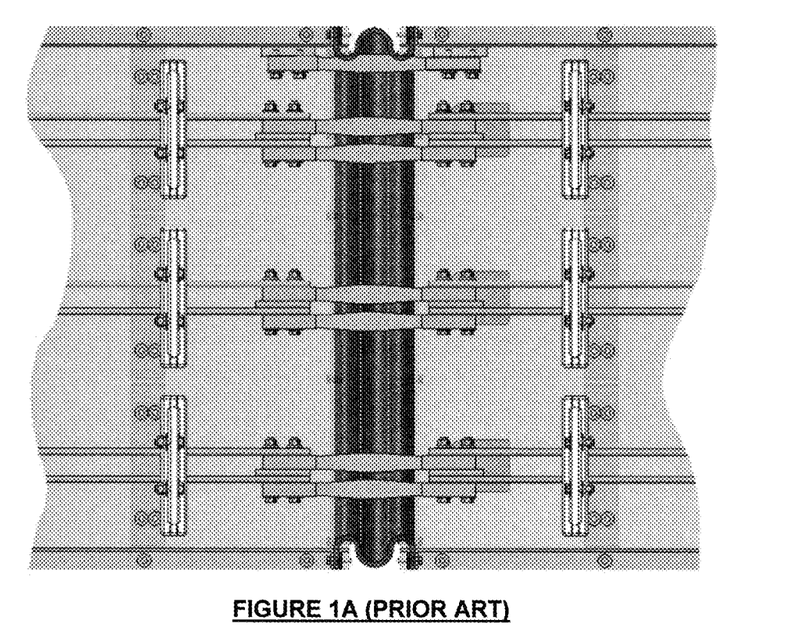
FIG. 1A (Prior Art) is a top view of an electrical arrangement of flat rigid conductors connected through flat connecting plates.
Figure 1B:
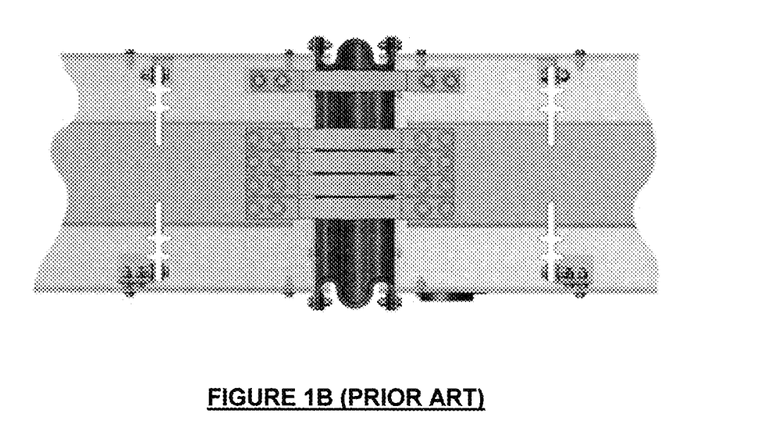
FIG. 1B (Prior Art) is a side view of the electrical arrangement of FIG. 1.

Typically, the flexible or rigid connecting conductors are bolted to the corresponding flat connecting plates, as shown in FIGS. 1A and 1B (Prior Art).

These arrangements may be complex to assemble in some applications using typical bus ducts. Moreover, the confined configuration typically used may generate a lot of heat that is difficult to dissipate.

It would therefore be desirable to provide an improved electrical arrangement for connecting a bus bar to an electrical conductor that would reduce at least one of the above-mentioned drawbacks of the prior art.

SUMMARY

According to a broad aspect, there is provided a bus bar comprising: a main tubular body extending along a longitudinal axis between a first end and a second end, the main tubular body being made of a first electrically conducting material for carrying an electrical current therealong; and a hollow connection body longitudinally projecting from the first end of the main tubular body and provided with a mounting surface for receiving an electrical connector thereto, the hollow connection body being made a second electrically conducting material for carrying the electrical current between the electrical connector and the main tubular body.

In one embodiment, the hollow connection body comprises a further tubular body provided with an inner face defining the mounting surface for receiving thereon the electrical connector.

In one embodiment, the further tubular body is provided with at least one aperture on the mounting surface for securing the electrical connector thereto.

In one embodiment, the at least one aperture comprises two apertures aligned along the longitudinal axis.

In one embodiment, an inner diameter of the further tubular body is equal to an inner diameter of the main tubular body.

In one embodiment, an outer diameter of the further tubular body is less than an outer diameter of the main tubular body.

In one embodiment, the hollow connection body comprises a truncated tubular body provided with a flat portion and a rounded portion secured together so that a cross-section of the truncated tubular body corresponds to a segment of a circle, the flat portion defining the mounting surface for receiving the electrical connector thereto.

In one embodiment, the flat portion is provided with at least one aperture extending therethrough for securing the electrical connector thereto.

In one embodiment, the at least one aperture comprises two apertures aligned along the longitudinal axis.

In one embodiment, an inner diameter of the rounded portion is equal to an inner diameter of the main tubular body.

In one embodiment, an outer diameter of the rounded portion is equal to an outer diameter of the main tubular body.

In one embodiment, the hollow connection body comprises two opposite rounded walls and two parallel flat walls secured together so that a cross-section of the hollow connection body is provided with a stadium shape, a given one of the two parallel flat walls defining the mounting surface for receiving the electrical connector thereto.

In one embodiment, the given one of the two parallel flat walls is provided with at least one aperture extending therethrough for securing the electrical connector thereto.

In one embodiment, the at least one aperture comprises two apertures aligned along the longitudinal axis.

In one embodiment, another one of the two parallel flat walls define the receiving surface for receiving a further electrical connector thereto.

In one embodiment, the another one of the two parallel flat walls is provided with at least one hole extending therethrough for securing the further electrical connector thereto.

In one embodiment, the at least one hole comprises two holes aligned along the longitudinal axis.

In one embodiment, the main tubular body and the hollow connection body are integral and the first electrically conducting material and the second electrically conducting material are identical.

In one embodiment, the main tubular body and the hollow connection body are distinct and secured together.

In one embodiment, the main tubular body and the hollow connection body are welded together.

In one embodiment, the first electrically conducting material and the second electrically conducting material are identical.

BRIEF DESCRIPTION OF THE DRAWINGS

In order that the invention may be readily understood, embodiments of the invention are illustrated by way of example in the accompanying drawings.

Further details of the invention and its advantages will be apparent from the detailed description included below.

DETAILED DESCRIPTION

In the following description of the embodiments, references to the accompanying drawings are by way of illustration of examples by which the invention may be practiced. It will be understood that other embodiments may be made without departing from the scope of the invention disclosed.

In at least some embodiments, the present bus bar is particularly devised to provide an easy to install and/or reliable electrical connection to an electrical conductor. The electrical conductor may be used to connect two bus bars together, as detailed below. As it will become apparent below, the present bus bar allows for improving dissipation of heat through enlarged dissipation portions in free contact with the surrounding air. In at least some embodiments, the present bus bar is particularly well suited for use in harsh vibrating environments such as in a wind turbine. In this case of wind turbines, bus bars may be connected together along the tower of the wind turbine in order to conduct electrical current from the power generator located in the nacelle of the wind turbine down to the grid.

Figure 2A:
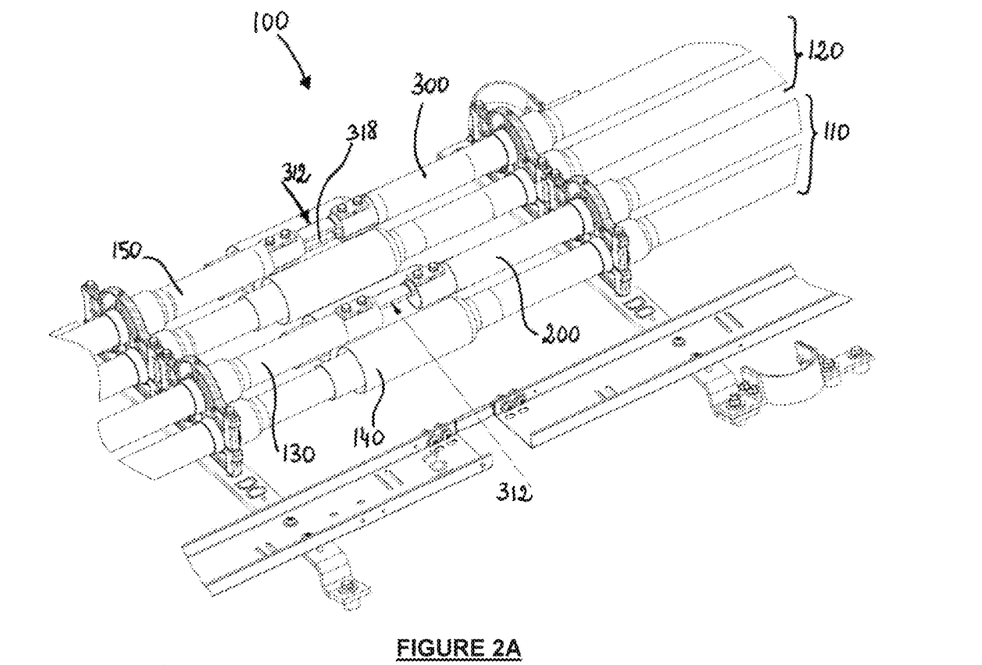
FIG. 2A is a perspective elevated view of an electrical arrangement showing a first set and a second set of bus bars, according to one embodiment.
Figure 2B:
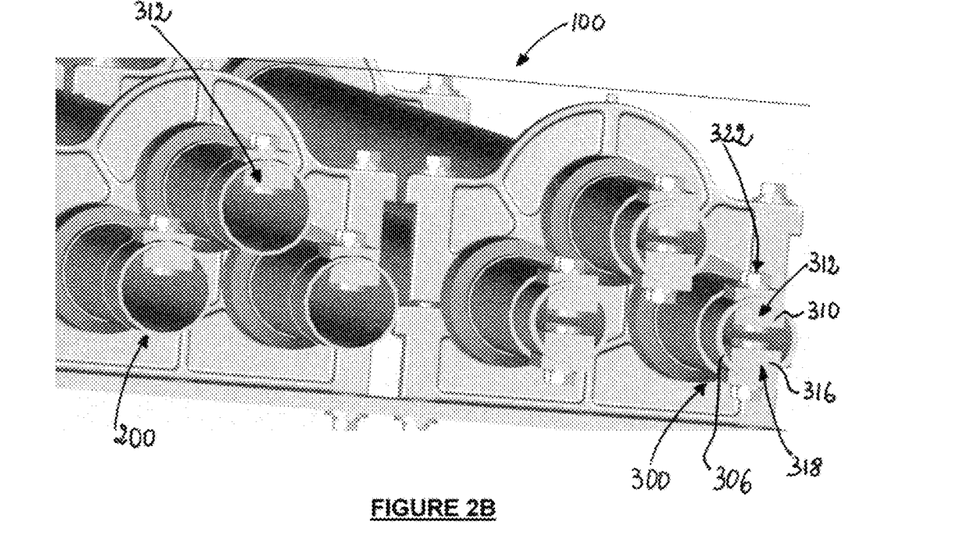
FIG. 2B is a cross sectional perspective view of the electrical arrangement shown in FIG. 2A.

FIGS. 2A and 2B illustrate one embodiment of an electrical arrangement 100 of tubular conductors, referred to as bus bars hereinafter. The arrangement 100 comprises a first set 110 of three electrical conductor assemblies and a second set 120 of three electrical conductor assemblies. Each electrical conductor assembly of the first set 100 comprises a first bus bar 130, a second bus bar 200 and an electrical connector 312 for electrically connecting the first and second bus bars 130 and 200 together. Each electrical conductor assembly of the second set 120 comprises a first bus bar 150, a second bus bar 300 and two electrical connectors 312 and 318 for electrically connecting the first and second bus bars 150 and 300 together.

In one embodiment, the bus bars 130 and 200 are identical. In another embodiment, the bus bars 130 and 200 are different. Similarly, the bus bars 150 and 300 are identical in one embodiment. In another embodiment, the bus bars 150 and 300 are different.

In one embodiment, the bus bars 130, 150, 200 and/or 300 are identical.

In an embodiment, in which the arrangement 100 of electrical conductor assemblies 110 and 120 is used in a wind turbine, the electrical conductor assembly 110 may be connected to the rotor of the generator of the wind turbine, e.g. the bus bars 200 may be each connected to a respective output of the rotor of the generator. Then the electrical conductor assembly 120 may be connected to the stator of the generator of the wind turbine, e.g. the bus bars 300 may be each connected to a respective output of the stator of the generator.

In one embodiment, the dimensions of a bus bar 130, 150, 200, 300 (e.g. the internal diameter, the external diameter or the thickness of the bus bar) and/or the conducting material from which it is made is chosen as a function of the characteristics of the electrical current to be carried therealong.

In one embodiment, the bus bar 130, 150, 200, 300 is rigid. In another embodiment, the bus bar 130, 150, 200, 300 is flexible.

The electrical connector 312, 318 may be any adequate electrical connector for electrically connecting two bus bars together. In one embodiment, the electrical connector 312, 318 comprises a plate made of conducting material. The plate may be flexible or rigid. In the illustrated embodiment, the electrical connector 312, 318 is a braid of conducting wires and has a substantially planar shape while being flexible.

Regarding the first set 110, each electrical connector 312 extends longitudinally between a first end that is electrically connected to a respective bus bar 200 and a second end that is electrically connected to a respective bus bar 130.

Regarding the second set 120, the bus bars 150 and 300 are electrically connected via two distinct electrical connectors 312 and 318. Each electrical connector 312 extends longitudinally between a first end that is electrically connected to a respective bus bar 300 and a second end that is electrically connected to a respective bus bar 150. Each electrical connector 318 also extends longitudinally between a first end that is electrically connected to a respective bus bar 300 and a second end that is electrically connected to a respective bus bar 150.

When used in a wind turbine, the arrangement 100 may be mounted to the internal wall of the tower of the wind turbine and several arrangements 100 may be electrically connected together via electrical connectors 312 and/or 318 so that the electrical current generated by the generator within the nacelle of the wind turbine can be carried down to the grid.

Figure 3:
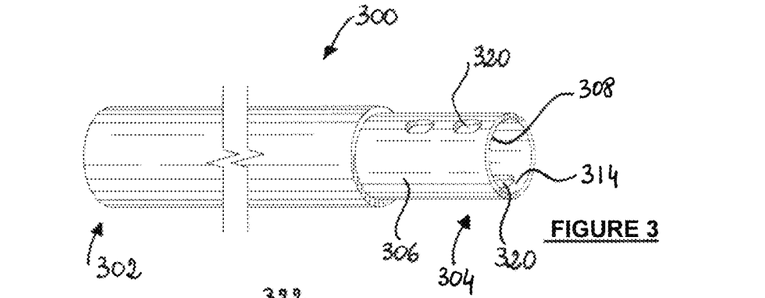
FIG. 3 is a perspective view of a bus bar shown in FIG. 2A, according to one embodiment.

FIG. 3 illustrates one embodiment for the bus bar 300. It should be understood that the description of the bus bar 300 applies at least partially to the bus bars 130, 150 and 200.

The bus bar 300 comprises a main tubular portion 302 which longitudinally extends between two ends and a connection portion 304 which projects longitudinally from a given end of the main tubular portion 302. The main tubular portion 302 is designed for carrying an electrical current therealong and the connection portion 304 is designed for connection with an electrical connector 312, 318. The connection portion 304 comprises a tubular body 306 which projects longitudinally from the given end of the main tubular portion 302. In the illustrated embodiment, the main tubular portion 302 and the tubular body have the same inner diameter but different outer diameters, i.e., the outer diameter of the main tubular body 302 is greater than that of the tubular body 306. However, it should be understood that other configurations may be possible. For example, the outer diameters of the main tubular portion 302 and the tubular body 306 may be identical.

While the cross-section of the connection portion 304 is circular to form a tubular body, it should be understood that other configurations are possible, as described below.

The tubular body 306 has an inner surface having a first mounting surface 308 for mounting an end 310 of a first electrical conductor 312 thereto, and a second mounting surface 314 for mounting an end 316 of a second electrical conductor 318 thereto (see FIG. 2B). While in the illustrated embodiment, the first mounting surface 308 faces the second mounting surface 314, it should be understood that other configurations may be possible.

In the illustrated embodiment, each of the first and second mounting surfaces 308 and 314 is provided with two apertures 320 longitudinally aligned and extending therethrough for connecting the respective end 312, 316 of the corresponding electrical connector 312, 318. As better shown in FIG. 2B and detailed below, a bolt and nut arrangement 322 may be used for performing the connection, although other arrangements could be considered. In one embodiment, a single radial aperture 320 may be used for each corresponding mounting surface 308, 314 but a two-point connection provides a stronger connection. Multiple points connections could also be considered. In one embodiment, the tubular body 306 may be provided with a single mounting surface 308, as illustrated on the left of FIG. 2A for the rotor connection. A plurality of mounting surfaces may also be used.

In one embodiment, the hollow structure of the tubular body 306 provides an enlarged dissipation surface in free contact with the surrounding air for improving dissipation of heat since both the outer surface and the inner surface of the tubular body 306 are effective to dissipate heat.

Figure 4:
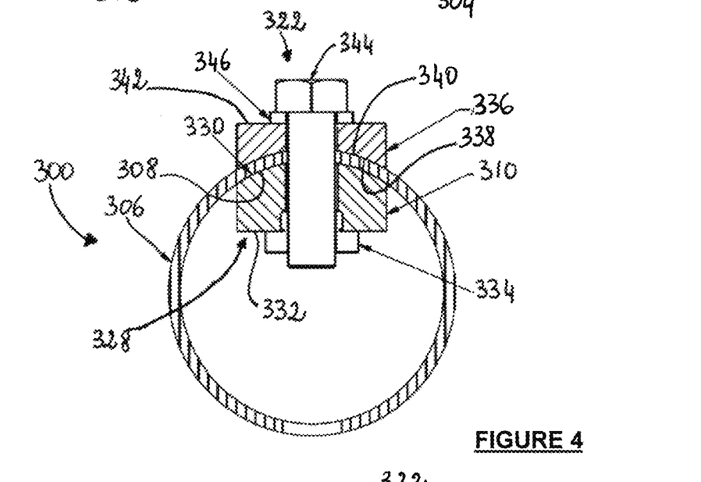
FIG. 4 is a cross sectional front view of a bus bar shown in FIG. 2A, according to one embodiment.

Referring now to FIG. 4, the connection between the mounting surface 308 of the tubular body 306 of the bus bar 300 and the first electrical conductor 312 is described in the following, according to one embodiment. As better shown in FIGS. 2A and 2B, the mounting surface 308 is provided on the inner surface of the tubular body 306 and the end 310 of the electrical conductor 312 is mounted thereto. In the illustrated embodiment, the electrical connector 312 comprises a braid of flexible electrical conductors and has a mounting portion 328 secured at an end of the braid of electrical conductors, the mounting portion 328 being provided with two radial apertures each for receiving a corresponding bold and nut arrangement 322 therethrough. The mounting portion 328 has a mounting surface 330 that is outwardly rounded to mat the inner mounting surface 308 of the tubular body 306. The mounting portion 328 of the electrical connector 312 also has a flat surface 332 opposed to the mounting surface 330. This flat surface 332 collaborates with a nut plug 334 mounted inside the tubular body 306 with the bolt and nut arrangement 322. A plate adapter 336 having an inwardly rounded surface 338 mating the outer surface 340 of the tubular body 306 opposed to the inner mounting surface 308 is mounted on the outer surface 340 of the tubular body 306. The plate adapter 336 also has a flat surface 342 opposed to the rounded surface 338 and devised to collaborate with the bolt 344 mounted through a lock washer 346. In one embodiment, contact grease is provided between the inner mounting surface 308 of the tubular body 306 and the mounting surface 330 of the mounting portion 328 of the electrical connector 312.

As it should now be apparent, such arrangement enables an easy installation of the electrical connector 312 to the bus bar 300. Moreover, it also allows to quickly and easily remove the electrical connector 312, for example for replacement. As it should also be apparent now, the electrical connector 312 may also be provided with another mounting portion at the other end of the braid of flexible electrical conductors for connection to another bus bar 150, as better shown in FIG. 2A. Furthermore, the mounting of the electrical connector 312 inside the hollow body 306 enables to provide a compact electrical arrangement.

Figure 5:
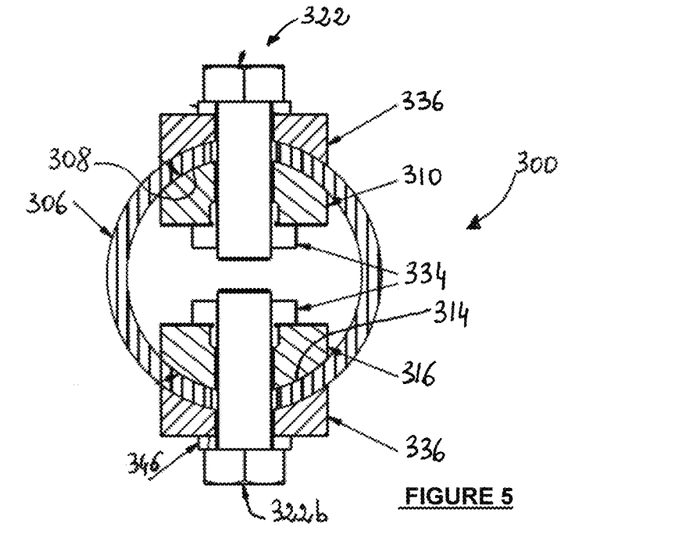
FIG. 5 is a cross sectional front view of another bus bar shown in FIG. 2A, according to another embodiment.

Referring now to FIG. 5, in a further embodiment, the second electrical connector 318 is connected to the second mounting surface 314 of the hollow body 306, the end 316 of the second electrical connector 318 being mounted similarly than the end 310 of the first electrical connector 312 with an additional bolt and nut arrangement 322b.

It should be understood that the tubular body 306 of the bus bar 300 may be provided with a single mounting surface.

Figure 6:
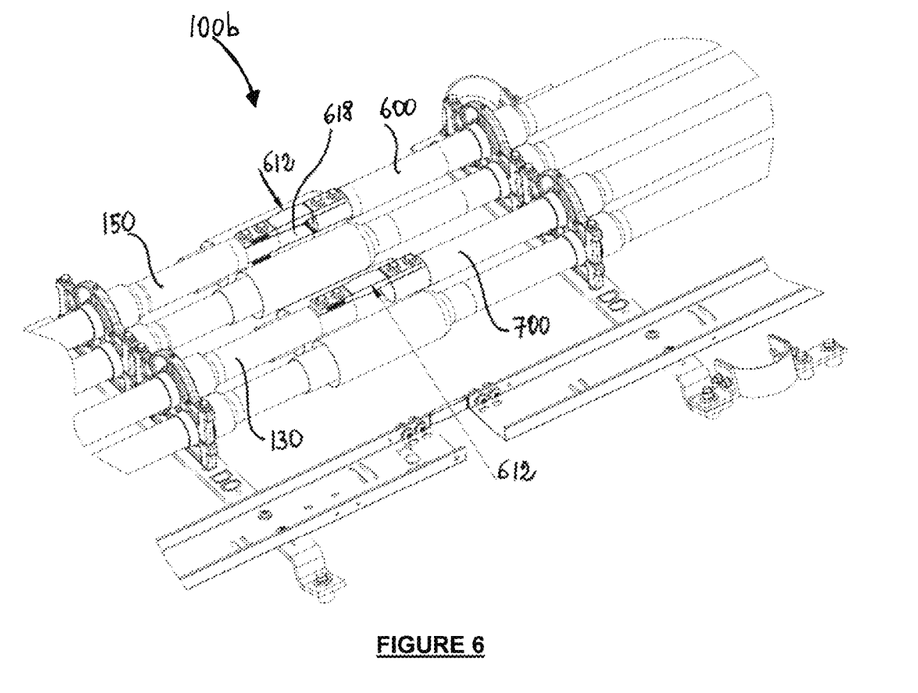
FIG. 6 is a perspective elevated view of an electrical arrangement showing a first set and a second set of bus bars, according to another embodiment.

FIG. 6 illustrates another embodiment of an electrical arrangement 100b. The arrangement 100b comprises a first set of three electrical conductor assemblies and a second set of three electrical conductor assemblies. Each electrical conductor assembly of the first set comprises a first bus bar 130, a second bus bar 700 and an electrical connector 612 for electrically connecting the first and second bus bars 130 and 700 together. Each electrical conductor assembly of the second set comprises a first bus bar 150, a second bus bar 600 and two electrical connectors 712 and 718 for electrically connecting the first and second bus bars 150 and 600 together.

In one embodiment, the bus bars 130 and 700 are identical. In another embodiment, the bus bars 130 and 700 may be different. Similarly, the bus bars 150 and 600 are identical in one embodiment. In another embodiment, the bus bars 150 and 600 may different.

In one embodiment, the bus bars 130, 150, 600 and/or 700 are identical.

In an embodiment, in which the arrangement 100b of electrical conductor assemblies is used in a wind turbine, the first set of electrical conductor assemblies may be connected to the rotor of the generator of the wind turbine, e.g. the bus bars 700 may be each connected to a respective output of the rotor of the generator. Then the second set of electrical conductor assemblies may be connected to the stator of the generator of the wind turbine, e.g. the bus bars 600 may be each connected to a respective output of the stator of the generator.

In one embodiment, the dimensions of a bus bar 130, 150, 200, 300 (e.g. the internal diameter, the external diameter or the thickness of the bus bar) and/or the conducting material from which it is made is chosen as a function of the characteristics of the electrical current to be carried therealong.

In one embodiment, the bus bar 130, 150, 600, 700 is rigid. In another embodiment, the bus bar 130, 150, 600, 700 is flexible.

The electrical connector 612, 712, 718 may be any adequate electrical connector for electrically connecting two bus bars together. In one embodiment, the electrical connector 612, 712, 718 comprises a plate made of conducting material. The plate may be flexible or rigid. In the illustrated embodiment, the electrical connector 612, 712, 718 comprises a braid of conducting wires or conductors extending between two end connection bodies and has a substantially planar shape while being flexible.

Regarding the first set of electrical conductor assemblies, each electrical connector 612 extends longitudinally between a first end that is electrically connected to a respective bus bar 700 and a second end that is electrically connected to a respective bus bar 130.

Regarding the second set of electrical conductor assemblies, the bus bars 150 and 600 are electrically connected via two distinct electrical connectors 712 and 718. Each electrical connector 712 extends longitudinally between a first end that is electrically connected to a respective bus bar 600 and a second end that is electrically connected to a respective bus bar 150. Each electrical connector 718 also extends longitudinally between a first end that is electrically connected to a respective bus bar 600 and a second end that is electrically connected to a respective bus bar 150.

When used in a wind turbine, the arrangement 100b may be mounted to the internal wall of the tower of the wind turbine and several arrangements 100b may be electrically connected together via electrical connectors 612 and/or 618 so that the electrical current generated by the generator within the nacelle of the wind turbine can be carried down to the grid.

Figure 7:
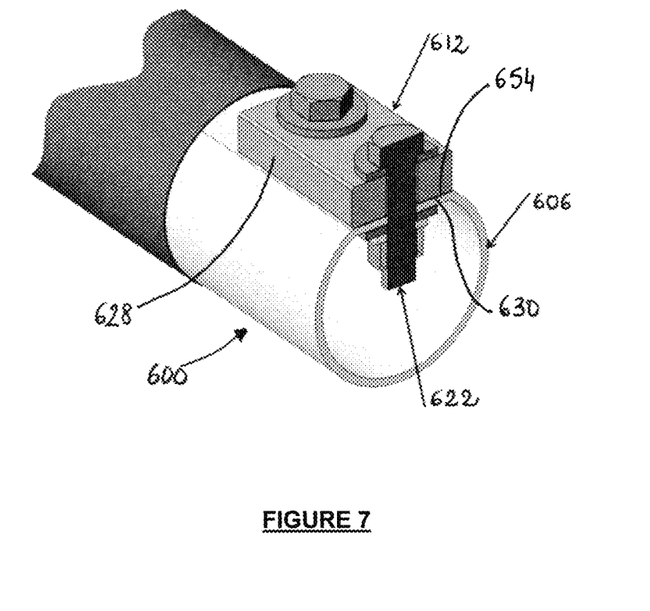
FIG. 7 is a cross sectional perspective view of a bus bar shown in FIG. 6, according to one embodiment.
Figure 8:
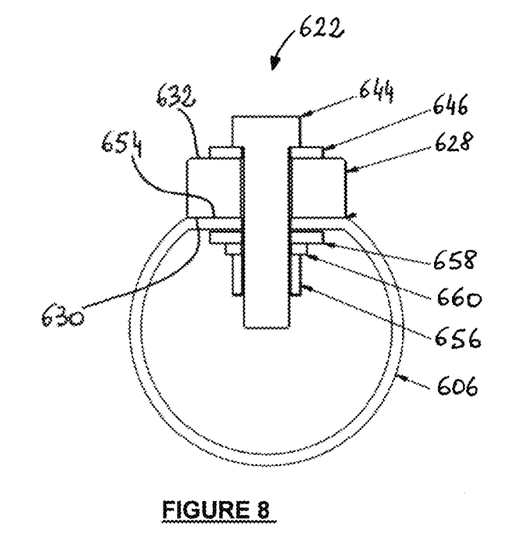
FIG. 8 is a cross sectional front view of the bus bar shown in FIG. 7, according to one embodiment.
Figure 9:
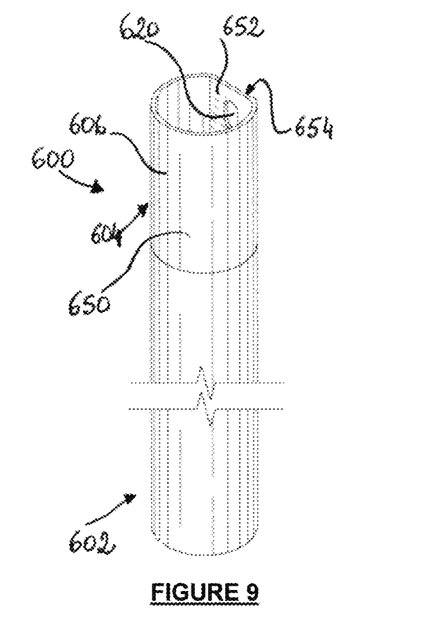
FIG. 9 is a perspective view of the bus bar shown in FIG. 7, according to one embodiment.

Referring to FIGS. 7-9, there is illustrated a bus bar 600 and the connection between a bus bar 600 and an electrical connector 612. As illustrated in FIG. 9, the bus bar 600 comprises a main tubular portion 602 which longitudinally extends between two ends and a connection portion 604 which projects longitudinally from a given end of the main tubular portion 602. The main tubular portion 602 is designed for carrying an electrical current therealong and the connection portion 604 is designed for connection with an electrical connector 612. The connection portion 604 comprises a hollow body 606 which projects longitudinally from the given end of the main tubular portion 602. The hollow body 606 has a generally tubular shape provided with a flat surface or meplat which extends along the longitudinal length of the hollow body 606 so that the cross-section of the hollow body 606 has the shape of a truncated circle or a segment of a circle. As a result, the wall of the hollow body 606 comprises a circular or rounded portion 650 and a flat portion 652.

The outer flat surface of the flat portion 652 of the hollow body 606 defines a mounting surface 654 for receiving thereon the electrical connector 612. In the illustrated embodiment, the flat portion 652 is provided with two longitudinally aligned apertures 620 for mounting the electrical conductor 612 thereto as illustrated in FIG. 7.

In the illustrated embodiment, the rounded portion 650 of the hollow body 606 has the same inner diameter and the same outer diameter as those of the main tubular portion 602. However, the person skilled in the art would understand that other configurations may be possible. For example, the outer diameter of the rounded portion 650 of the hollow body may have a diameter that is less than the diameter of the main tubular portion 602.

In one embodiment, the portions 602 and 604 are integral. In another embodiment, the portions 602 and 604 are distinct portions and secured together. For example, the portions 602 and 604 may be welded or otherwise fixedly secured together.

Referring now to FIGS. 7 and 8, the connection between the mounting surface 654 of the hollow body 606 and the electrical connector 612 is now described, according to one embodiment. As better illustrated in FIG. 6, the electrical connector 612 is mounted to the mounting surface 654 of the flat portion 652 of the hollow body 606. In the illustrated embodiment, the electrical connector 612 comprises a braid of flexible electrical conductors and a mounting portion 628 secured at one end of the braid of flexible electrical conductors. The mounting portion 628 is provided with two apertures, each for receiving a corresponding bold and nut arrangement 622 therethrough. The mounting portion 628 is provided with a flat mounting surface 630 that mat the outer flat mounting surface 654 of the flat portion 652 of the hollow body 606. The mounting portion 628 of the electrical connector 612 also an additional flat surface 632 opposite to the flat mounting surface 630. In this embodiment, since the surfaces 630 and 632 are flat, a plate adapter such as the plate adapter 336 is not required. Rather, a bolt 644 and a flat washer 646 are used outside of the hollow body 606, and a hexagonal nut 656 associated with a flat washer 658 and a lock washer 660 are mounted with the bolt 644 inside the hollow body 606. Contact grease may also be provided between the mounting surface 654 of the hollow body 606 and the mounting surface 630 of the mounting portion 628 of the electrical conductor 612. As it should be apparent, such arrangement enables an easy installation of the electrical connector 612 to the bus bar 600. Moreover, it also allows to quickly and easily remove the electrical connector 612, for replacement for example.

As it should also be apparent now, the electrical connector 612 may also be provided with another mounting portion at the other end of the braid of flexible electrical conductors for connection to another bus bar such as bus bar 130, as better shown in FIG. 6. The fact that the mounting surface 654 is recessed relative to the tubular portion 606 provides a compact electrical arrangement when the electrical connector 612 is secured to the bus bar 600.

Referring to FIGS. 10-13, there is illustrated a bus bar 700 and the connection between a bus bar 700 and electrical connectors 712 and 718.

Figure 12:
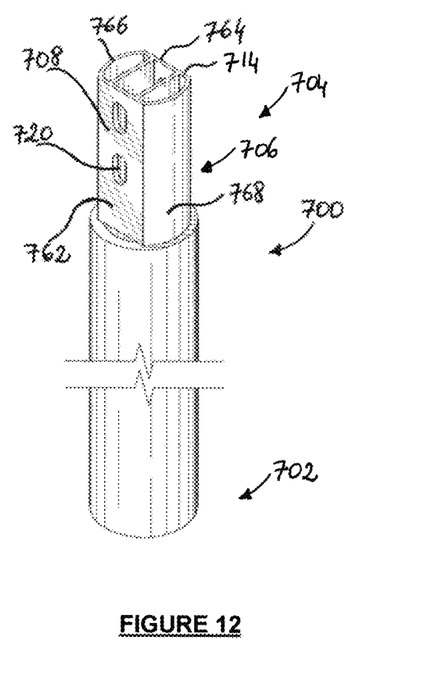
FIG. 12 is a perspective view of the bus bar shown in FIG. 10, according to one embodiment.

As illustrated in FIG. 12, the bus bar 700 comprises a main tubular portion 702 which longitudinally extends between two ends and a connection portion 704 which projects longitudinally from a given end of the main tubular portion 702. The main tubular portion 702 is designed for carrying an electrical current therealong and the connection portion 704 is designed for connection with electrical connectors 712 and 718. The connection portion 704 comprises a hollow body 706 which projects longitudinally from the given end of the main tubular portion 702. The hollow body 606 has a generally truncated tubular shape provided with two opposite and parallel flat surfaces or meplats which each extend along the longitudinal length of the hollow body 706. As a result, the hollow body 706 comprises two planar or flat and parallel walls 762 and 764 and two outwardly opposite and rounded or curved walls 766 and 768 which each extend between the two planar parallel walls 762 and 764 so that the cross-section of the hollow body 706 has a stadium shape. The flat walls 762 and 764 are each provided with two longitudinally aligned apertures 720 extending therethrough and each aperture 720 of the flat wall 762 faces a respective aperture 720 of the flat wall 764.

Figure 13:
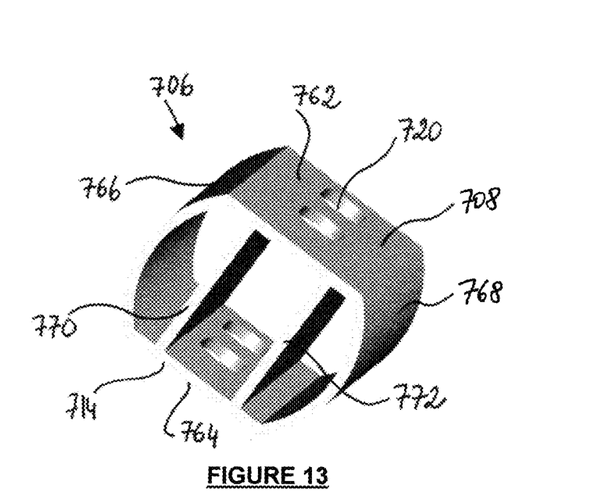
FIG. 13 is a perspective view of a hollow body of the bus bar shown in FIG. 12.

In one embodiment such as the illustrated embodiment, the connection portion 704 is designed so as to enhance heat dissipation by increasing the overall available heat dissipation surface of the hollow body 706. In one embodiment, at least one conducting wall projecting inside the hollow body 706 can be provided. In the illustrated embodiment, the hollow body 706 further comprises two parallel heat dissipating walls 770 and 772 which each extend between the two flat walls 762 and 764 along the length of the hollow body 706. The heat dissipating walls 770 and 772 are located on each side of the apertures 720 so that the apertures 720 are located between the two heat dissipating walls 770 and 772. The presence of the heat dissipating walls 770 and 772 allows for increasing the overall surface area of the hollow body 706, and therefore increasing the heat dissipation capabilities of the hollow body 706, in addition to reinforce the structure of the hollow body 706. Various other arrangements allowing the increase the overall dissipating surface of the hollow body 706 may be considered. For example in the same embodiment or another embodiment, the hollow body 706 may be provided with at least one transverse wall extending between the two opposite and rounded walls 766 and 768 along an axis orthogonal to the longitudinal axis of the hollow body 706.

The outer flat surface of the flat wall 762 of the hollow body 706 defines a mounting surface 708 for receiving thereon the electrical connector 712 and the outer flat surface of the flat wall 764 of the hollow body 706 defines a mounting surface 714 for receiving thereon the electrical connector 718.

Figure 10:
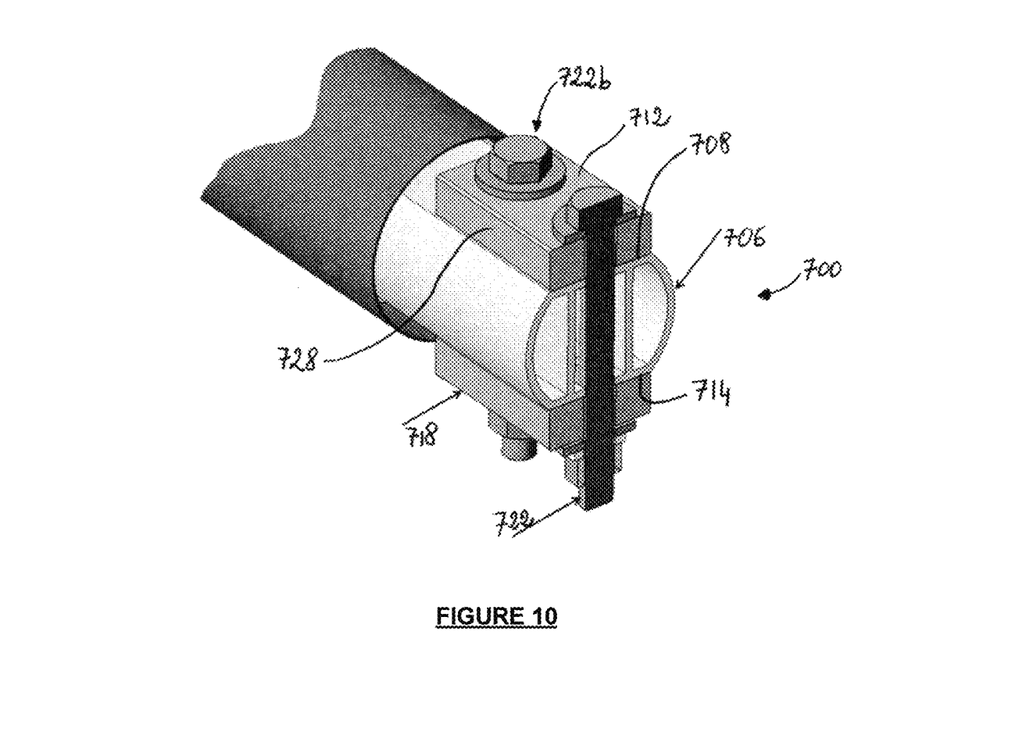
FIG. 10 is a cross sectional perspective view of another bus bar shown in FIG. 6, according to another embodiment.
Figure 11:
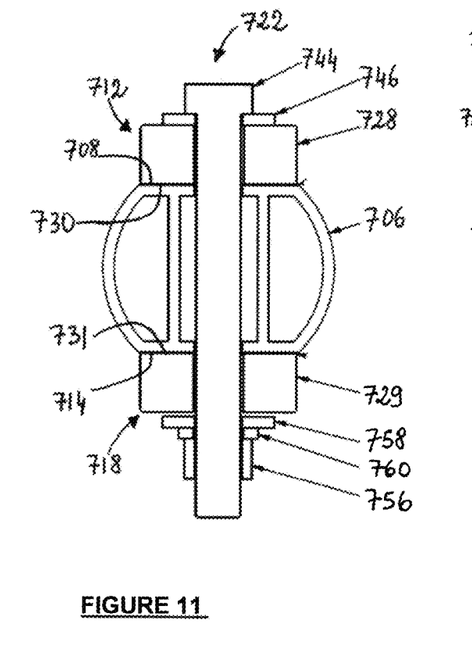
FIG. 11 is a cross sectional front view of the bus bar shown in FIG. 10, according to another embodiment.

The electrical connectors 712, 718 are secured to the hollow body 706 with two bolt and nut arrangement 722 and 722b each comprising a bolt 744 extending through the hollow body 706 via two respective and opposite apertures 720 and a nut 756, illustrated in FIGS. 10 and 11. This embodiment provides an easy mounting of the electrical connectors 712 and 718 since the nut 756 is mounted from the outside of the hollow body 706. It should be understood that a single two bolt and nut arrangement may be used for securing the electrical connectors 712 and 718 to the hollow body. In this case, the hollow body may comprise a single aperture 720 on each flat wall 762, 764.

As illustrated in FIGS. 10 and 11, since the mounting surfaces 708 and 714 of the hollow body 706 are flat, no plate adapter such as plate adapter 336 is not required. Rather, a bolt 744 and a flat washer 746 are used on one side of the hollow body 706, and a the nut 756 such as a hexagonal nut associated with a flat washer 758 and a lock washer 760 are mounted with the bolt 744 on the opposite side of the hollow body 706. Contact grease may also be provided between the mounting surfaces 708 and 714 of the hollow body 706 and the mounting surfaces 730 and 731 of the mounting portions 728 and 729 of both electrical connectors 712 and 718.

In one embodiment, such an arrangement enables an easy installation of the electrical conductors 712 and 718 to the bus bar 700. Moreover, it also allows to quickly and easily remove the electrical connectors 712 and 718, for replacement for example.

In the illustrated embodiment, the rounded or tubular portion of the hollow body 706 has the same inner diameter as that of the main tubular portion 702 and an outer diameter that is less than that of the main tubular portion 702. However, the person skilled in the art would understand that other configurations may be possible. For example, the outer diameter of the rounded or tubular portion of the hollow body 706 may have the same diameter as that of the main tubular portion 702.

In one embodiment, the portions 702 and 704 are integral and they may be manufactured using an extrusion method for example. In another embodiment, the portions 702 and 704 are distinct portions and secured together. For example, the portions 702 and 704 may be welded or otherwise fixedly secured together.

In one embodiment and with reference is made again to FIGS. 2A and 6 previously described. As it should now be apparent, the bus bars 200, 300, 600, 700 previously described are particularly well suited for any applications requiring connecting two bus bars together through an electrical conductor in a reliable and easy manner even in harsh environments. Such arrangement may be of great advantage for use in specific applications requiring to use several bus bars longitudinally operatively connected to convey electric power on long distances. For example, in tall wind turbines, electric power produced in the nacelle on the top of the pole should be convey to the bottom of the pole, typically with rigid bus bars that are subjected to movements and vibrations of large amplitude. Typically, the two bus bars connected together are identical but it could also be considered to connect two bus bars of different diameter together, according to a specific application.

In one embodiment, the bus bar 130, 150, 200, 300, 600, 700 may be covered with a sleeve which may be made of an insulating material. Similarly, an insulating sleeve such as the tubular insulating body 140 illustrated in FIG. 2A may be mounted around the electrical connector and partially over the two bus bars connected to the electrical connector.

It should be understood that both the main tubular body 302, 602, 702 and the connection body 304, 604, 704 are both made of an electrically conducting material. In one embodiment, the main tubular body 302, 602, 702 and the connection body 304, 604, 704 are made from the same electrically conducting material. In another embodiment, the main tubular body 302, 602, 702 and the connection body 304, 604, 704 are made from different electrically conducting materials.

Although the above description relates to specific preferred embodiments as presently contemplated by the inventors, it will be understood that the invention in its broad aspect includes mechanical and functional equivalents of the elements described herein.

What is claimed is:

1. A bus bar, comprising:
   a main tubular body extending along a longitudinal axis between a first end and a second end, the main tubular body being made of a first electrically conducting material for carrying an electrical current therealong; and
   a hollow connection body longitudinally projecting from the first end of the main tubular body and provided with a mounting surface for receiving an electrical connector thereto, the hollow connection body being made of a second electrically conducting material for carrying the electrical current between the electrical connector and the main tubular body; and
   wherein the hollow connection body comprises two opposite rounded walls, two parallel flat walls extending along the longitudinal axis of the main tubular body, and two vertical walls connected to the two parallel flat walls and extending perpendicular to the longitudinal axis, one of the two parallel flat walls defining the mounting surface for receiving the electrical connector thereto.

2. The bus bar of claim 1, wherein the hollow connection body comprises a truncated tubular body provided with the two opposite rounded walls and the two parallel flat walls secured together so that a cross-section of the truncated tubular body corresponds to a segment of a circle.

3. The bus bar of claim 2, wherein at least one of the two parallel flat walls is provided with at least one aperture extending therethrough for securing the electrical connector thereto.

4. The bus bar of claim 3, wherein the at least one aperture comprises two apertures aligned along the longitudinal axis.

5. The bus bar of claim 1, wherein an inner diameter of the two opposite rounded walls is equal to an inner diameter of the main tubular body.

6. The bus bar of claim 1, wherein an outer diameter of the two opposite rounded walls is equal to an outer diameter of the main tubular body.

7. The bus bar of claim 1, wherein the hollow connection body.

8. The bus bar of claim 1, wherein the one of the two parallel flat walls defining the mounting surface is provided with at least one aperture extending therethrough for securing the electrical connector thereto.

9. The bus bar of claim 8, wherein the at least one aperture comprises two apertures aligned along the longitudinal axis.

10. The bus bar of claim 1, wherein another of the two parallel flat walls defines another of the mounting surface for receiving a further electrical connector thereto.

11. The bus bar of claim 10, wherein the another of the two parallel flat walls defining the another mounting surface is provided with at least one hole extending therethrough for securing the further electrical connector thereto.

12. The bus bar of claim 11, wherein the at least one hole comprises two holes aligned along the longitudinal axis.

13. The bus bar of claim 1, wherein the main tubular body and the hollow connection body are integral and the first electrically conducting material and the second electrically conducting material are identical.

14. The bus bar of claim 1, wherein the main tubular body and the hollow connection body are distinct and secured together.

15. The bus bar of claim 14, wherein the first electrically conducting material and the second electrically conducting material are identical.

16. The bus bar of claim 14, wherein the main tubular body and the hollow connection body are welded together.

* * * * *